(12) United States Patent
Anderson et al.

(10) Patent No.: US 6,262,848 B1
(45) Date of Patent: *Jul. 17, 2001

(54) HEAD-UP DISPLAY

(75) Inventors: Douglas W. Anderson, Richardson; Russell E. Mauldin, Garland, both of TX (US); Patrick A. Trotta, Oro Valley, AZ (US)

(73) Assignee: Raytheon Company, Lexington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,165

(22) Filed: Apr. 29, 1999

(51) Int. Cl.⁷ .................................................. G02B 27/14
(52) U.S. Cl. .......................... 359/630; 359/631; 359/633
(58) Field of Search ................................... 359/630, 631, 359/632, 633, 634, 13

(56) References Cited

U.S. PATENT DOCUMENTS

| 4,961,625 |   | 10/1990 | Wood et al. ......................... 350/174 |
| 5,013,135 | * | 5/1991  | Yamamura ........................... 359/630 |
| 5,056,890 | * | 10/1991 | Iino et al ............................ 359/630 |
| 5,289,312 | * | 2/1994  | Hashimoto et al. ................. 359/487 |
| 5,414,439 | * | 5/1995  | Groves et al. ........................ 345/7 |
| 5,497,271 | * | 3/1996  | Mulvanny et al. .................. 359/631 |
| 5,657,163 | * | 8/1997  | Wu et al. ............................. 359/630 |
| 5,859,714 | * | 1/1999  | Nakazawa et al. ................... 359/13 |
| 5,864,432 | * | 1/1999  | Deter ................................... 359/634 |
| 5,867,133 | * | 2/1999  | Toffolo et al. .......................... 345/7 |

FOREIGN PATENT DOCUMENTS

| 26 33 067 A1 | 2/1978  | (DE) | ................................. G08G/1/16 |
| 0 710 866 A1 | 5/1986  | (EP) | ............................... G02B/27/01 |
| 0 312 094 A2 | 4/1989  | (EP) | ............................... G02B/27/00 |
| 0 515 328 A1 | 11/1992 | (EP) | ............................... G02B/27/00 |
| 0 643 315 A1 | 3/1995  | (EP) | ............................... G02B/27/01 |
| 2 693 807 A1 | 7/1992  | (FR) | ............................... G02B/27/18 |
| 2 246 900    | 2/1992  | (GB) | ............................... G09F/19/18 |
| WO 89/03059  | 4/1989  | (WO) | ............................... G02B/27/00 |

OTHER PUBLICATIONS

Fresnel Optics Brochure, Fresnel Optics, Inc., Date Unknown, 8 pages.
PCT International Search Report dated Aug. 8, 2000 for PCT/US00/11695 dated Apr. 26, 2000.

* cited by examiner

*Primary Examiner*—Georgia Epps
*Assistant Examiner*—Saeed Seyrafi
(74) *Attorney, Agent, or Firm*—Baker Botts L.L.P.

(57) ABSTRACT

A system that provides a head-up display for an operator of a vehicle includes a collection device that can collect infrared energy and an image source coupled to the collection device. The image source can generate a visual image based on the collected infrared energy. The system also includes a lens through which the visual image passes before presentation to the operator of the vehicle and a reflector that can reflect the visual image before presentation to the operator of the vehicle.

23 Claims, 4 Drawing Sheets

HEAD-UP DISPLAY

TECHNICAL FIELD OF THE INVENTION

This invention relates to optical systems, and more particularly to head-up displays.

BACKGROUND OF THE INVENTION

Infrared imaging systems generate a visual image based on collected infrared energy. Such a system can provide vision enhancement for the operator of a vehicle by supplying the operator with a head-up display (HUD) of the visual image generated by the infrared imaging system.

Existing HUD systems suffer from several drawbacks. First, the visual image displayed by many systems represents a narrow field-of-view in front of the vehicle. In addition, existing HUD systems produce a negative eyebox, meaning that the entire visual image in the HUD is not visible at any point in the vehicle. These HUD systems may also suffer from large aberrations of the visual image and poor vertical disparity.

SUMMARY OF THE INVENTION

The present invention substantially reduces or eliminates at least some of the disadvantages and problems associated with previous head-up display (HUD) systems. In certain embodiments, the present invention provides a compact, low cost HUD system that displays a wide field-of-view (FOV) and has good eyebox, distortion, and vertical disparity characteristics.

In one embodiment of the present invention, a system that provides a head-up display for an operator of a vehicle includes a collection device that is operable to collect infrared energy and an image source that is coupled to the collection device. The image source is operable to generate a visual image based on the collected infrared energy. The system also includes a lens through which the visual image passes before presentation to the operator of the vehicle and a reflector that is operable to reflect the visual image before presentation to the operator of the vehicle.

In another embodiment, a system that provides a head-up display for an operator of a vehicle includes a collection device that is operable to collect infrared energy and an image source that is coupled to the collection device. The image source is operable to generate a visual image based on the collected infrared energy. The system also includes a beam splitter through which the visual image passes a first time and a second time. The system further includes a first reflector that is operable to reflect the visual image after it passes through the beam splitter the first time and a second reflector that is operable to reflect the visual image after it passes through the beam splitter the second time.

The present invention has several important technical features and advantages. First, placing a lens in the optical path can reduce the distortion and other optical aberrations of the visual image compared to a simple reflective element system, even where the windshield of the vehicle serves as a reflector. Reducing the aberrations improves operator discernability of the visual image. Further, because of the reduced aberrations, the system can display an FOV in front of the vehicle of greater than twelve degrees. Displaying a greater FOV is beneficial to operators negotiating curvy roads and to operators who need to view objects on the side of the road, especially those may enter the path of the vehicle. In addition, the system can provide a positive eyebox, which allows operator head movement while viewing the entire visual image, and a low vertical disparity, which reduces operator eyestrain. Also, the refractive nature of the lens allows for a more compact optical system than a simple reflective element system, allowing the use of a smaller image source, which reduces system cost. Moreover, in particular embodiments, the image source and the lens can fit within the dashboard of the vehicle, a significant ergonomic and aesthetic consideration.

In other embodiments, the HUD system may include an additional reflector. The additional reflector introduces an extra degree of freedom to provide further correction for distortion. Such a system is still compact enough so that the additional reflector can fit within the dashboard with the image source and the lens.

In still other embodiments that use an additional reflector, a beam splitter can replace the lens. Using a beam splitter allows the additional reflector to align substantially symmetric with the optical axis between the reflector and the additional reflector, which improves the optical performance over previous a simple reflective element system. But again, the system uses only a minimum number of optical elements and may be compact enough to fit within the dashboard of the vehicle. Moreover, these embodiments readily allow the image source to use polychromatic light.

Other technical advantages and features will be readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figure 1:
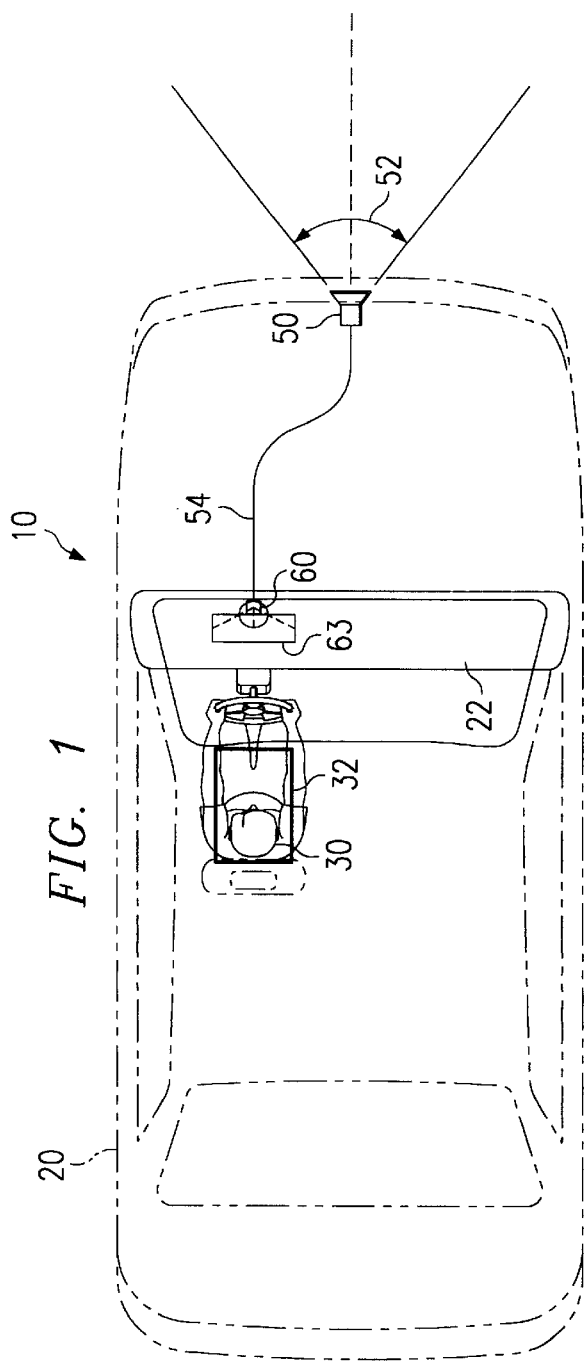
FIG. 1 provides a top view of a system for providing a head-up display for an operator of a vehicle.

FIG. 1 provides a top view of a system 10 for providing a head-up display (HUD) 63 for an operator 30 of a vehicle 20. System 10 includes an image source 60 located in a dashboard 22 of vehicle 20. Image source 60 generates a visual image that becomes HUD 63 after encountering selected optical elements, discussed below. To generate the visual image, image source 60 receives electrical signals that represent the infrared energy in front of vehicle 20 from a collection device 50. Image source 60 couples to collection device 50 by a communication link 54. Collection device 50 collects the infrared energy emitted in front of vehicle 20 that is within a field-of-view (FOV) of collection device 50, indicated by arrow 52. In certain embodiments, collection device 50 collects infrared energy in the long wave infrared (LWIR) band, e.g., 7.5–13.5 microns.

In operation, collection device 50 collects the infrared energy emitted by objects within FOV 52. Collection device 50 then communicates electrical signals that represent the collected infrared energy to image source 60 using communication link 54. Image source 60 processes the signals that represent the collected infrared energy into a visual image. Image source 60 then generates the visual image, which becomes HUD 63 after encountering selected optical elements.

Operator 30 can view the entire visual image in HUD 63 when his eyes are within an eyebox 32. Although a two-dimensional representation of eyebox 32 is shown in FIG. 1, eyebox 32 is generally a three-dimensional volume in which operator 30 can move his head and still view the entire visual image in HUD 63. As operator 30 moves his head outside of eyebox 32, only a portion, if any, of the visual image in HUD 63 will remain viewable.

Widening FOV 52 of collection device 50 allows system 10 to display a wider area in front of vehicle 20 to operator 30 in HUD 63. Displaying a wider area in front of vehicle 20 allows operator 30 to view more of the road as vehicle 20 maneuvers through curves and to view objects on the side of the road. As discussed below, certain optical elements allow system 10 to display a wider area in front of vehicle 20 in HUD 63.

Figure 2:
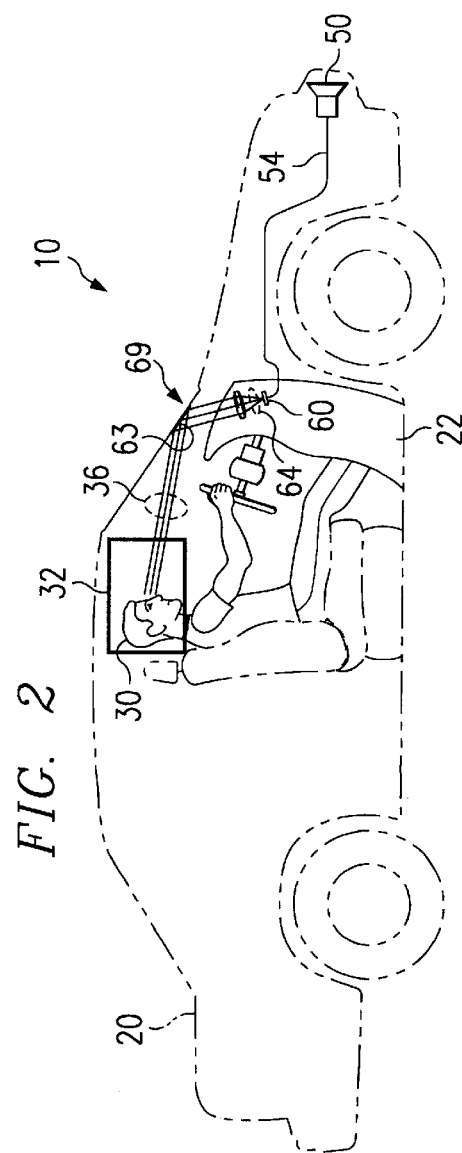
FIG. 2 provides a side view of the system for providing the head-up display for the operator of the vehicle.

FIG. 2 provides a side view of system 10 for providing HUD 63 for operator 30 of vehicle 20. As in FIG. 1, system 10 includes collection device 50 coupled to image source 60 in dashboard 22 by communication link 54. System 10 also includes one or more optical elements 69 in an optical path 36. Optical path 36 is defined by light rays 64 that propagate from image source 60 to the eyes of operator 30. As illustrated, each light ray 64 represents the center point of the visual image, but in reality, there are a large number of light rays 64 for each point of the visual image. Note, optical path 36 can change orientation as it encounters each optical element 69. Optical elements 69 can include lenses, beam combiners, beam splitters, or any other type of light manipulating or processing device.

In operation, image source 60 receives the electrical signals representing the infrared energy collected by collection device 50 using communication link 54. Then, image source 60 generates the visual image, which propagates through vehicle 20 as light rays 64. Light rays 64 encounter optical elements 69 before presentation to operator 30 as HUD 63. Note, light rays 64 propagate from HUD 63 to the eyes of operator 30 so that operator 30 can view the visual image in HUD 63. System 10 displays HUD 63 just below, e.g., five to fifteen degrees, the line of sight (LOS) of operator 30 to prevent HUD 63 from interfering with normal driving vision. Again, the entire visual image in HUD 63 is viewable by operator 30 anywhere in eyebox 32. In a particular embodiment, the visual image in HUD 63 is a virtual image with an image distance of approximately three meters from operator 30.

Figure 3:
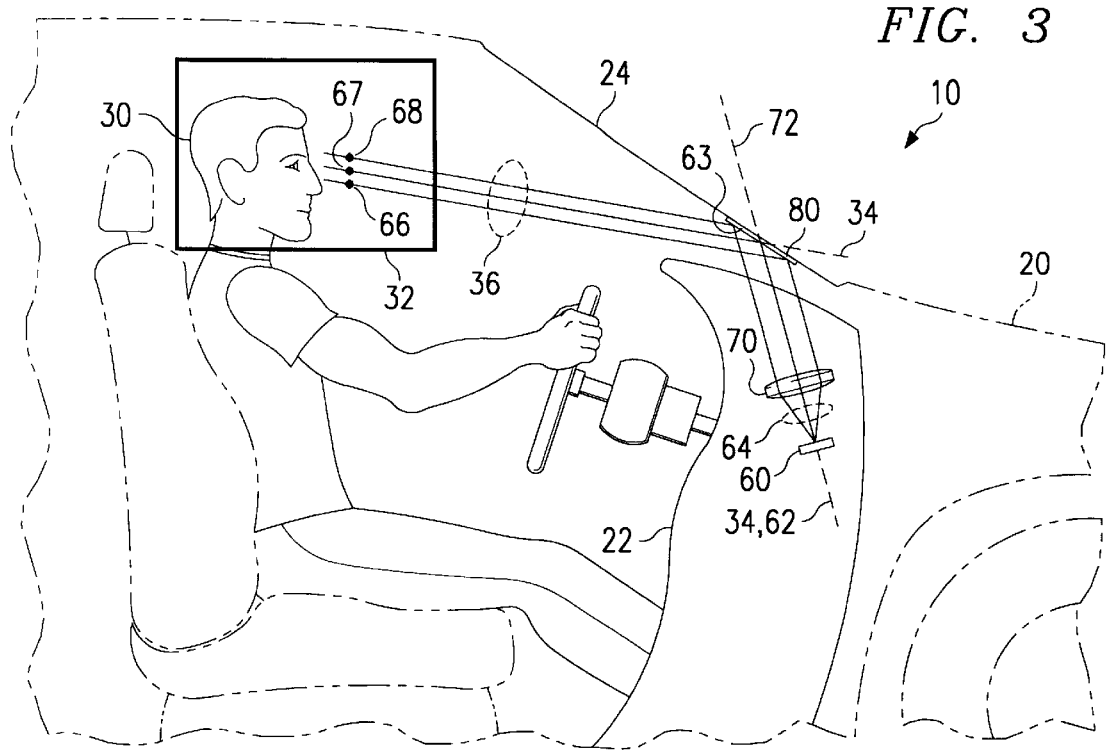
FIG. 3 illustrates an embodiment of the system in which a lens and an image source are located in a dashboard of the vehicle.

FIG. 3 illustrates an embodiment of system 10 with a lens 70 and image source 60 located in dashboard 22 of vehicle 20. In this embodiment, system 10 also includes a reflector 80. Lens 70 has a local mechanical axis 72 that aligns substantially with an optical axis 34 between reflector 80 and image source 60. Optical axis 34 is defined as the center of optical path 36 between operator 30 and image source 60. Note, optical path 36 varies in orientation as light rays 64 encounter selected optical elements. A local mechanical axis 62 of image source 60 also aligns substantially with optical axis 34 between reflector 80 and image source 60. In a particular embodiment, reflector 80 is a windshield 24 of vehicle 20, and lens 70 is a collimating lens, such as a Fresnel lens.

In operation, image source 60 generates a visual image based on the infrared energy collected by collection device 50. The visual image propagates through vehicle 20 as light rays 64. Light rays 64 first encounter lens 70, which refracts light rays 64 as they pass through. Light rays 64 then encounter reflector 80, which reflects light rays 64, producing HUD 63. After reflecting from reflector 80, light rays 64 propagate through the interior of vehicle 20 to operator 30.

As illustrated, each light ray 64 represents the same point of the visual image generated by image source 60. Thus, operator 30 can view the same point of the visual image at a number of points in eyebox 32, such as points 66, 67, 68. There are numerous points such as points 66, 67, 68 in eyebox 32 so that operator 30 can view the same point of the visual image simultaneously in both eyes and can move his head in three dimensions while still viewing the same point of the visual image. Moreover, there are numerous light rays such as light rays 64 for every point of the visual image generated by image source 60. Thus, operator 30 can view the entire visual image in HUD 63 at numerous points in eyebox 32.

Reflector 80 can be a silver-backed piece of glass, polished metal, glass, plastic, coated or uncoated windshield 24, a beam combiner, or any other material that possesses reflective properties. In the embodiments where reflector 80 is windshield 24, windshield 24 may reflect and refract light rays 64. Thus, not using windshield 24 as reflector 80 can eliminate any ghost images of the visual image that windshield 24 may produce due to the visual image reflecting from the inner surface and the outer surface of windshield 24.

Image source 60 can be a liquid crystal display, a cathode light ray tube (CRT) display, or any other electronic display device that can generate a visual image. In a particular embodiment, image source 60 may use monochromatic light to generate the visual image, to reduce chromatic aberrations that may be caused by polychromatic light. In another particular embodiment, a filter can filter polychromatic light from image source 60 to produce pseudomonochromatic light for system 10.

The ability to align lens 70 substantially symmetric on optical axis 34 between reflector 80 and image source 60 allows for significant reduction in distortion over a simple reflective element system, even when reflector 80 is windshield 24. Also, aligning lens 70 substantially symmetric on optical axis 34 makes the distortion generally symmetric and reduces other optical aberrations. Because of the reduction in aberrations that lens 70 provides, HUD 63 of system 10 can display a greater FOV 52 in front of vehicle 20 in HUD 63 than a simple reflective element system. System 10 can also provide low vertical disparity, often less than five milliradians. Vertical disparity occurs when light rays 64 do not possess the same elevation angle when entering each eye of operator 30. The asymmetry of windshield 24 is a major cause of vertical disparity. Because each eye of operator 30 compensates for the vertical disparity by looking in a different direction than the other eye, decreasing vertical disparity reduces eyestrain on operator 30. In addition, the refractive nature of lens 70 allows system 10 to use a relatively small image source 60, reducing cost. Moreover, lens 70 may be located in dashboard 22 with image source 60, providing an ergonomic and aesthetic design, especially when windshield 24 serves as reflector 80.

In certain embodiments, lens 70 is a Fresnel lens. A Fresnel lens possesses performance characteristics similar to a traditional collimating lens, but has a lower volume and, hence, weight. A Fresnel lens approximates the performance characteristics of a traditional collimating lens while occupying a smaller volume by matching the external curvature for discrete sections of the collimating lens while eliminating a large portion of the internal material of the collimating lens. Thus, using a Fresnel lens in the compact environment of dashboard 22 offers a significant improvement over a traditional collimating lens in the ability to mount and configure system 10. A Fresnel lens can be made of glass, plastic, acrylic, or any other material through which light can pass. If made of plastic, the Fresnel lens can be formed in an injection molded process.

Figure 4:
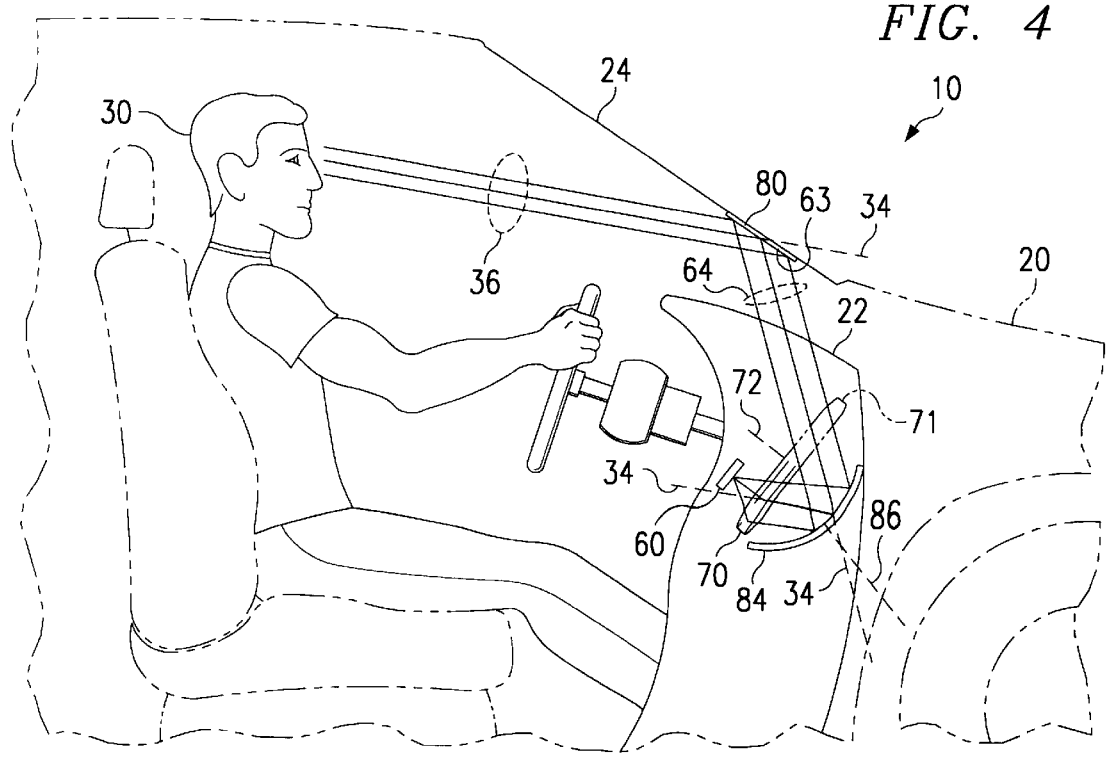
FIG. 4 illustrates an embodiment of the system in which an additional reflector is located in the dashboard of the vehicle.

FIG. 4 illustrates an embodiment of system 10 with an additional reflector 84 located within dashboard 22 of vehicle 20. Reflector 84 can be a silver backed piece of glass, polished metal, glass, plastic, a beam combiner, or any other material that possesses reflective properties. In this embodiment, lens 70 is only one-half of a standard lens, the other one-half indicated by shadowed lines 71. Local mechanical axis 72 of lens 70 does not necessarily align with optical axis 34 between reflector 84 and lens 70, and a local mechanical axis 86 of reflector 84 does not necessarily align with optical axis 34 between reflector 80 and reflector 84. Note, local mechanical axis 86 and local mechanical axis 72 may or may not align. In a particular embodiment, reflector 84 is a curved mirror, reflector 80 is windshield 24 of vehicle 20, and lens 70 is a Fresnel lens.

In operation, image source 60 generates the visual image, which propagates from image source 60 as light rays 64 and first encounters lens 70. Lens 70 refracts light rays 64, which then encounter reflector 84. Reflector 84 reflects light rays 64, which then encounter reflector 80. Reflector 80 also reflects light rays 64, producing HUD 63. From reflector 80, light rays 64 propagate through the interior of vehicle 20 to the eyes of operator 30.

Although lens 70 and reflector 84 may not substantially align with optical axis 34, locating reflector 84 in optical path 36 introduces an extra degree of freedom into system 10, which allows further correction of the distortion and other optical aberrations introduced by windshield 24.

Figure 5:
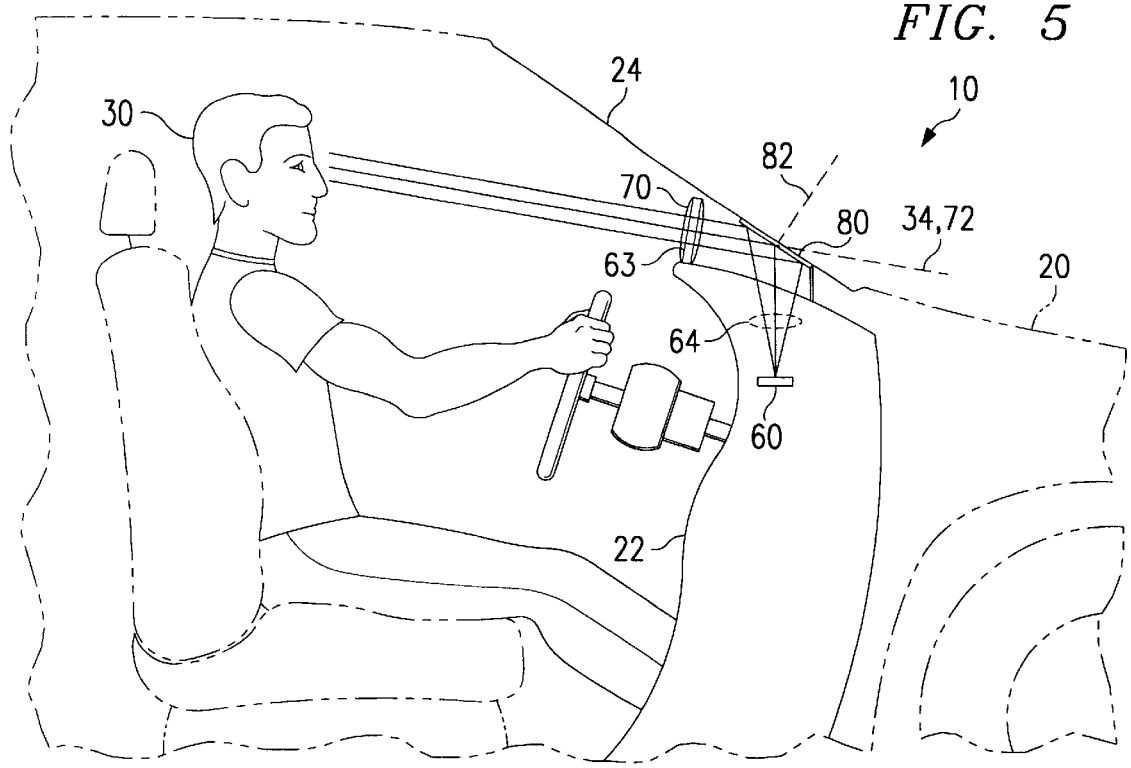
FIG. 5 illustrates an embodiment of the system in which the lens is mounted on the dashboard of the vehicle.

FIG. 5 illustrates an embodiment of system 10 with lens 70 mounted on dashboard 22 of vehicle 20. In this embodiment, lens 70 is located on optical axis 34 between operator 30 and reflector 80. In a particular embodiment, reflector 80 is a plane mirror that also mounts on dashboard 22, lens 70 is a Fresnel lens, and local mechanical axis 72 of lens 70 aligns substantially with optical axis 34 between operator 30 and reflector 80. Note, a local mechanical axis 82 of reflector 80 does not align with optical axis 34 between operator 30 and reflector 80.

In operation, image source 60 generates a visual image based on the infrared energy collected by collection device 50. After the visual image propagates from image source 60 as light rays 64, reflector 80 reflects light rays 64, and then, lens 70 refracts light rays 64, producing HUD 63. From lens 70, light rays 64 propagate through the interior of vehicle 20 to the eyes of operator 30.

This embodiment provides enhanced display brightness and greatly reduces aberrations of the visual image in HUD 63 when reflector 80 is not windshield 24. Moreover, not using windshield 24 as reflector 80 or coating windshield 24 with a non-transparent reflective coating can eliminate ghost images of the visual image that windshield 24 may produce due to the visual image reflecting from the inner surface and the outer surface of windshield 24.

In certain embodiments, lens 70 and reflector 80 can independently mount on dashboard 22. In other embodiments, lens 70 and reflector 80 can be part of an integral unit that mounts on dashboard 22. In a particular embodiment, lens 70 and reflector 80 can fold into or onto dashboard 22 when not in use, reducing any obstruction of the vision of operator 30 through windshield 24.

Figure 6:
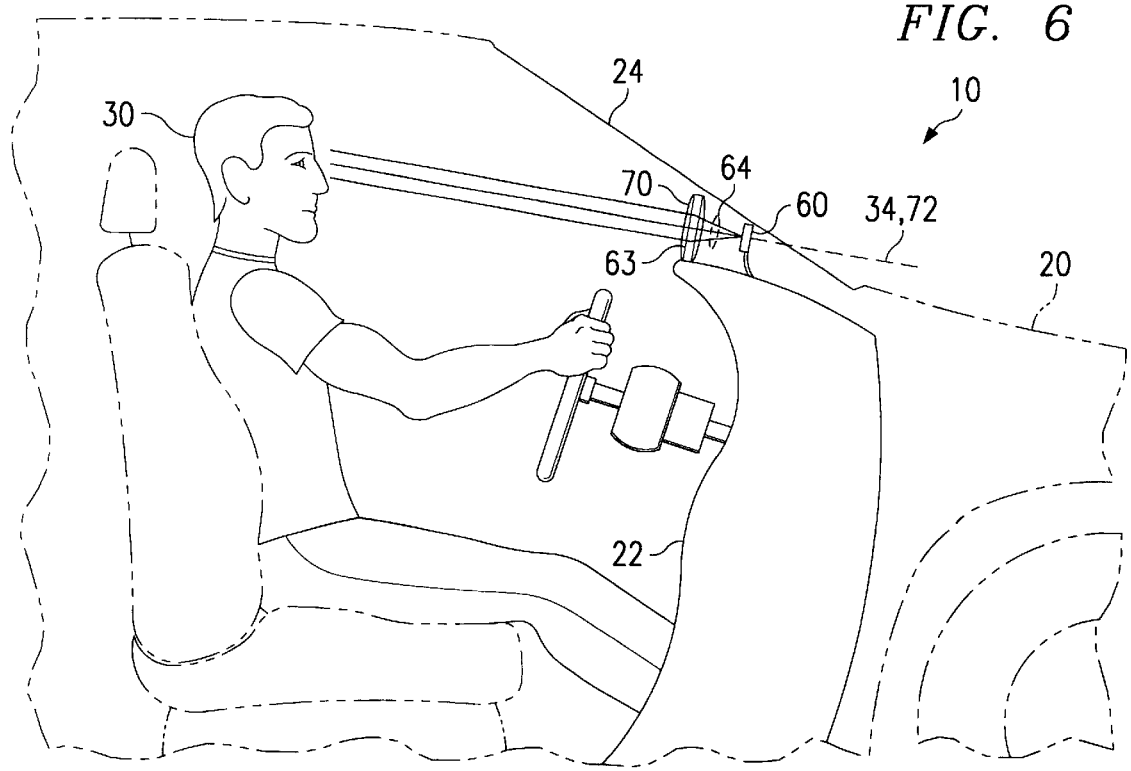
FIG. 6 illustrates an embodiment of the system in which the lens and the image source are mounted on the dashboard of the vehicle.

FIG. 6 illustrates an embodiment of system 10 with lens 70 and image source 60 mounted on dashboard 22 of vehicle 20. In this embodiment, local mechanical axis 72 of lens 70 aligns substantially with optical axis 34 between operator 30 and image source 60. As before, lens 70 mounts so that HUD 63 is just below the LOS of operator 30 through windshield 24. In a particular embodiment, lens 70 is a Fresnel lens.

In operation, image source 60 generates a visual image based on the infrared energy collected by collection device 50. After the visual image propagates from image source 60 as light rays 64, lens 70 refracts light rays 64, producing HUD 63. From lens 70, light rays 64 propagate through the interior of vehicle 20 to the eyes of operator 30. This embodiment provides enhanced display brightness and greatly reduces aberrations of the visual image in HUD 63.

In certain embodiments, lens 70 and image source 60 can independently mount on dashboard 22. In other embodiments, lens 70 and image source 60 can be part of an integral unit that mounts on dashboard 22. In a particular embodiment, lens 70 and image source 60 can fold into or onto dashboard 22 when not in use, reducing any obstruction of the vision of operator 30 through windshield 24.

Figure 7:
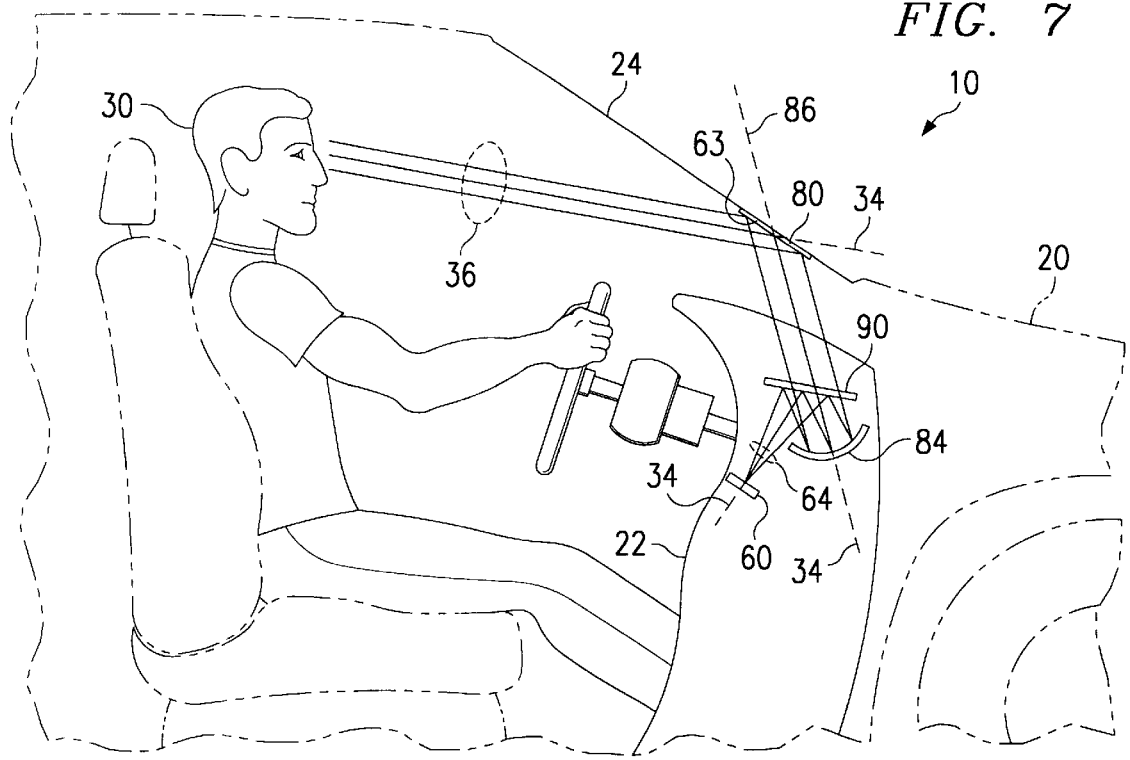
FIG. 7 illustrates an embodiment of the system in which a beam splitter and the additional reflector are located in the dashboard of the vehicle.

FIG. 7 illustrates an embodiment of system 10 with a beam splitter 90 and reflector 84 located in dashboard 22 of vehicle 20. Beam splitter 90 allows a portion of the energy in a ray of light to pass through and reflects the other portion of the energy. The ratio between the amount of energy in a ray of light that beam splitter 90 allows to pass through and the amount of energy in a ray of light that beam splitter 90 reflects is adjustable. The introduction of beam splitter 90 into optical path 36 allows local mechanical axis 86 of reflector 84 to align substantially with optical axis 34 between reflector 80 and reflector 84.

In operation, image source 60 generates a visual image based on the infrared energy collected by collection device 50. The visual image propagates from image source 60 as light rays 64 and encounters beam splitter 90 a first time, which allows a portion of the energy of each light ray 64 to pass through beam splitter 90 and reflects the other portion of the energy of each light ray 64. The portion of each light ray 64 that beam splitter 90 allows to pass through in the first encounter is not shown. The portion of each light ray 64 that reflects from beam splitter 90 then encounters reflector 84, which reflects light rays 64. Light rays 64 then encounter beam splitter 90 a second time, which again reflects a portion of the energy of each light ray 64 and allows a portion of the energy of each light ray 64 to pass through. The portion of each light ray 64 that beam splitter 90 reflects in the second encounter is not shown. The portion of light each ray 64 that passes through beam splitter 90 during the second encounter with beam splitter 90 then encounters reflector 80, which reflects the portion of each light ray 64, producing HUD 63. From reflector 80, light rays 64 propagate through the interior of vehicle 20 to the eyes of operator 30.

Due to beam splitter 90, light rays 64 that encounter reflector 80 possess only a portion of the energy they possessed at image source 60. In a particular embodiment, beam splitter 90 allows approximately one-half of the energy in a ray of light to pass through and reflects the other energy. Therefore, light rays 64 that encounter reflector 80 may only possess approximately one-fourth of the energy they possessed at image source 60. In a particular embodiment, reflector 80 is windshield 24 of vehicle 20, and reflector 84 is a curved mirror. In other embodiments, reflector 80 is a plane mirror.

By aligning reflector 84 substantially symmetric with optical axis 34 between reflector 80 and reflector 84, this embodiment of system 10 improves the optical performance over a simple reflective element system while still using a minimum number of optical elements 69 in optical path 36. Moreover, chromatic aberration is not a significant concern.

For all of the embodiments discussed, optical elements, whether located in or mounted on dashboard 22, may mount to dashboard 22 with standard optical mounting brackets. For optical elements located in dashboard 22, the optical mounting brackets can mount inside an optical box that can house all of optical elements located in dashboard 22, along with image source 60. Operator 30 may vary HUD 63 vertically and/or horizontally by adjusting the optical box in elevation and/or azimuth, respectively.

System 10 has been illustrated using a car as vehicle 20. System 10, however, is also useful in other vehicles, such as trucks, trains, aircraft, tanks, and boats. Thus, vehicle 20 can be any motorized transport device that has an operator 30. Further, system 10 can include other information in HUD 63, such as the speed, status, heading, and/or position of vehicle 20.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system that provides a head-up display for an operator of a vehicle, comprising:
   a collection device for collecting infrared energy;
   an image source coupled to the collection device, the image source generating light rays representing a visual image based on the collected infrared energy;
   a refractive lens propagating light rays from the image source for presentation to the operator of the vehicle; and
   a reflector for reflecting the visual image for presentation to the operator of the vehicle;
   wherein the system produces a positive three-dimensional eyebox.

2. The system of claim 1, wherein the lens is aligned substantially symmetric on an optical axis between the reflector and the image source.

3. The system of claim 1, wherein:
   the lens is aligned substantially symmetric on an optical axis between the reflector and the image source;
   the image source and the lens are located within a dashboard of the vehicle, and
   the reflector comprises a windshield of the vehicle.

4. The system of claim 1, wherein:
   the mechanical axis of the lens has substantial alignment with an optical axis between the operator and the reflector; and
   the reflector comprises a mirror.

5. The system of claim 1, further comprising an additional reflector for directing the light rays representing the visual image to the reflector after passing through the lens.

6. The system of claim 1, wherein the lens comprises a Fresnel lens.

7. The system of claim 1, wherein the image source comprises a liquid crystal display.

8. The system of claim 1, wherein the system displays a field-of-view in front of the vehicle of at least thirteen degrees.

9. A method for providing a head-up display for an operator of a vehicle, comprising:
   collecting infrared energy in a field-of-view in front of the vehicle;
   generating light rays representing a visual image based on the collected infrared energy using an image source;
   propagating the visual image through a lens for presentation to the operator of the vehicle; and
   reflecting the visual image for presentation to the operator of the vehicle.
   wherein the image may be viewed in a positive three-dimensional eyebox.

10. The method of claim 9, further comprising aligning the mechanical axis of the lens substantially symmetric on an optical axis between a reflector and the image source.

11. The method of claim 9, wherein reflecting the visual image comprises reflecting the visual image with a windshield of the vehicle and further comprising:
    aligning the mechanical axis of the lens substantially symmetric on an optical axis between a reflector and the image source; and
    locating the image source and the lens within a dashboard of the vehicle.

12. The method of claim 9, further comprising locating the mechanical axis of the lens on an optical axis between the operator and a reflector.

13. The method of claim 9, further comprising reflecting the light rays representing the visual image after passing through the lens to a reflector.

14. The method of claim 9, wherein the image represents a field-of-view in front of the vehicle of at least thirteen degrees.

15. A system for providing a three-dimensional eyebox head-up display for an operator of a vehicle, comprising:
    a collection device for collecting infrared energy;
    an image source coupled to the collection device and mounted on the dashboard of the vehicle, the image source generating light rays representing a visual image based on the collected infrared energy; and
    a refractive lens mounted on the dashboard of the vehicle, the lens propagating light rays from the image source for presentation to the operator of the vehicle, the lens having a mechanical axis substantially aligned with the optical path between the operator of a vehicle and the image source.

16. The system of claim 15, wherein the mechanical axis of the lens is aligned substantially symmetric on an optical axis between the operator and the image source.

17. The system of claim 15, wherein the image source and the lens are configured to reduce obstruction of the vision of the operator when not in use.

18. The system of claim 15, wherein the lens comprises a Fresnel lens.

19. The system of claim 15, wherein the image source comprises a liquid crystal display.

20. A system for providing a three-dimensional eyebox head-up display for an operator of a vehicle, comprising:
   a collection device for collecting infrared energy;
   an image source coupled to the collection device, the image source generating light rays representing a visual image based on the collected infrared energy;
   a beam splitter reflecting the light rays representing the visual image a first time and propagating the light rays a second time;
   a first reflector for reflecting the light rays representing the visual image after reflecting from the beam splitter the first time;
   a second reflector for reflecting the light rays representing the visual image after propagating through the beam splitter the second time; and
   wherein the mechanical axis of the first reflector substantially aligns with the optical axis between the first reflector and the second reflector.

21. The system of claim 20, wherein the image source, the beam splitter, and the first reflector are located within a dashboard of the vehicle.

22. The system of claim 20, wherein the system displays a field-of-view in front of the vehicle of greater than twelve degrees.

23. The system of claim 20, wherein the image source comprises a liquid crystal display.

* * * * *

UNITED STATES PATENT AND TRADEMARK OFFICE
CERTIFICATE OF CORRECTION

PATENT NO. : 6,262,848 B1
DATED : July 17, 2001
INVENTOR(S) : Douglas W. Anderson et al.

It is certified that error appears in the above-identified patent and that said Letters Patent is hereby corrected as shown below:

<u>Title page,</u>
U.S. PATENT DOCUMENTS,
insert -- 6,100,943 8/2000 Koide et al. --.

OTHER PUBLICATIONS,
Line 2, after "Aug.", delete "8", and insert -- 31 --.

<u>Column 7,</u>
Line 66, after "vehicle", delete ",", and insert -- ; --.

<u>Column 8,</u>
Line 25, after "vehicle", delete ".", and insert -- ; --.

Signed and Sealed this

Twenty-fifth Day of December, 2001

Attest:

*Attesting Officer*

JAMES E. ROGAN
*Director of the United States Patent and Trademark Office*